June 25, 1935.  B. FREUND  2,005,914
APPARATUS FOR MAKING AND REPRODUCING SOUND AND PICTURE RECORDS
Filed Dec. 8, 1931  2 Sheets-Sheet 1
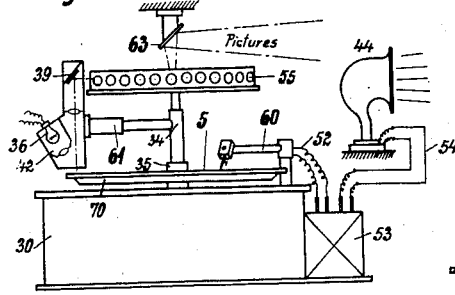
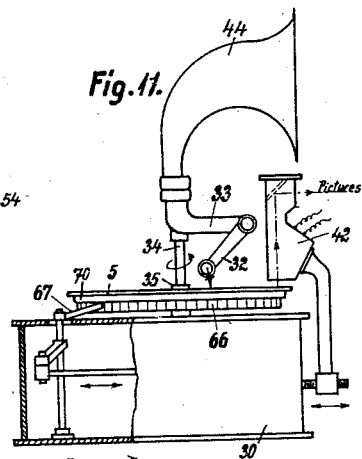
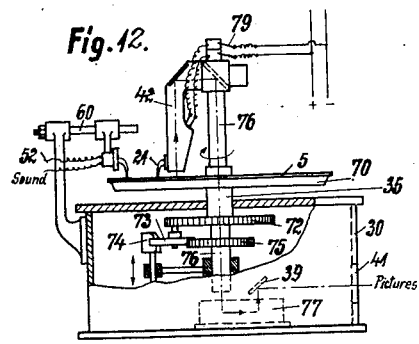
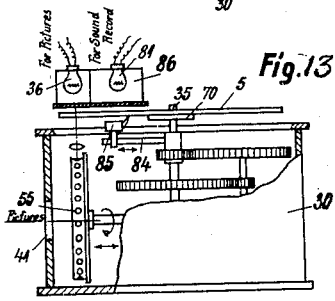
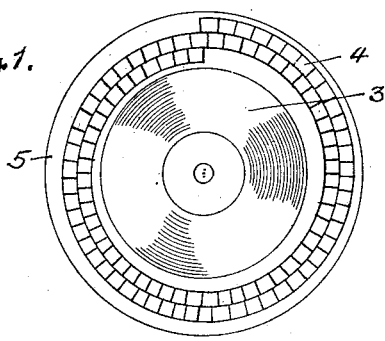
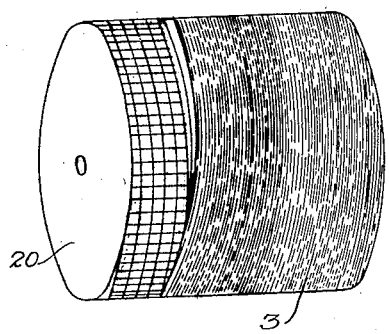
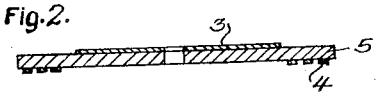

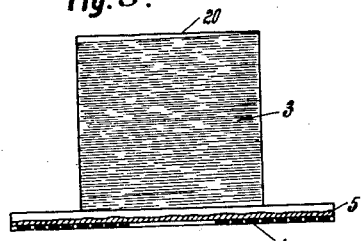
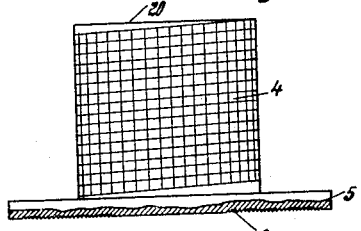
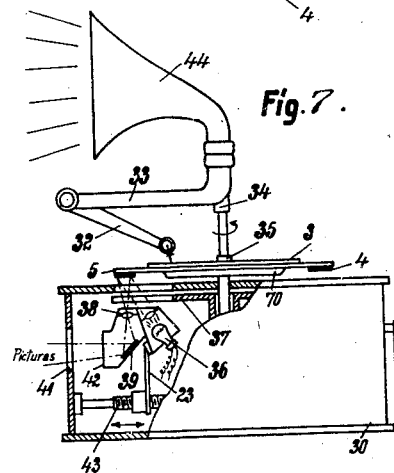
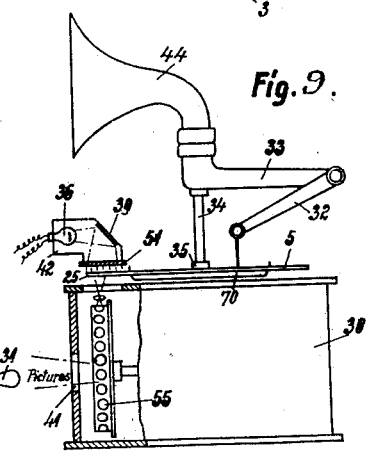
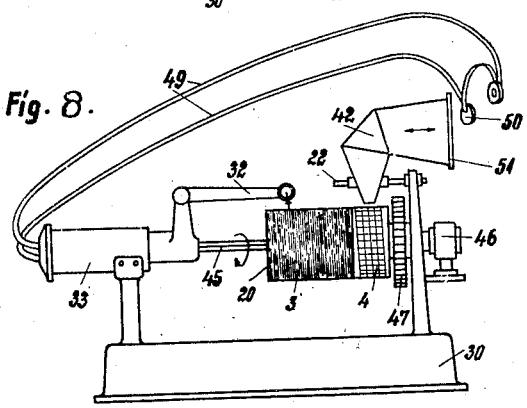

Patented June 25, 1935

2,005,914

UNITED STATES PATENT OFFICE 2,005,914

APPARATUS FOR MAKING AND REPRODUCING SOUND AND PICTURE RECORDS

Berthold Freund, Berlin-Schoneberg, Germany

Application December 8, 1931, Serial No. 579,754
In Germany December 11, 1930

13 Claims. (Cl. 88—16.2)

My invention relates to combined sound and picture records, and to apparatus for reproducing same.

It is an object of my invention to provide an improved combined record and an improved apparatus for reproducing the record.

More particularly, it is an object of my invention to so design a plate-shaped record—not a film or band—and the apparatus for reproducing it, that each record is scanned at its own individual velocity which must be higher for the sound record. To this end, I make the sound record or spiral longer than the picture record or picture spiral.

Combined records on the usual flat gramophone records have already been made by arranging the pictures—reduced to a very small scale—in a spiral, with a single sound-record groove along the spiral.

This has the drawbacks that the duration of the reproduction is very short and that the space available for the pictures is utilized very inefficiently on account of the unfavorable relation of the scanning velocity to the pitch of the record spirals.

The two distinct individual scanning velocities for the sound and picture records or spirals may be obtained in various ways. For instance, the bearer may be moved at a comparatively low velocity for reproducing the pictures while the sound box moves at a considerably higher velocity but in the same direction, or at a less high velocity in opposite direction. Or the bearer may be moved at such a velocity that the sound record is scanned by a fixed sound box, as in a normal talking machine, and the comparatively small relative movement for the picture record be obtained by moving a picture-scanning member at a somewhat higher or lower velocity. Or the bearer for the records may be stationary and the scanning members may move at two distinct velocities, or the support may move as well as the members.

In the accompanying drawings, record bearers and apparatus for reproducing the records are illustrated diagrammatically by way of example.

In the drawings

Fig. 1 illustrates a record with the picture spiral surrounding the sound spiral, in plan view, Figs. 2 and 3 are elevations of the record shown in Fig. 1, with the spirals on opposite sides and on the same side of the bearer, respectively, Fig. 4 is a perspective illustration of a cylindrical record, Figs. 5 and 6 show two types of combined flat and cylindrical records, Fig. 7 shows a combined projector and talking machine for flat records which are opaque, with a rotary record plate and sound box, Fig. 8 shows a machine for cylindrical records, Fig. 9 shows a machine for a record having a transparent support for the picture spiral, with optical compensating means, otherwise similar to that in Fig. 7, Fig. 10 shows a machine with a fixed sound box and a rotary picture-scanning member, Fig. 11 shows a machine in which the record, and Fig. 12 shows a machine in which the picture-scanning member is rotated intermittently, and Fig. 13 shows a machine for a record having a photographed sound spiral.

Referring now to the drawings, and first to Fig. 1, 5 is a circular record bearer or plate, 3 is the spiral sound record, and 4 is the spiral picture record which surrounds the sound spiral 3. In Fig. 2, the spirals are on opposite sides, and in Fig. 3 they are on the same side of the record 5.

The records may be made of any suitable material which may be opaque or more or less transparent. A preferred record is flexible and transparent throughout or transparent only in its picture-bearing portion.

Records may also be built up from two different materials, and the spirals may be made on each record part separately or on the built-up and finished record. It is also possible to make records on one, or both, of the record parts while they are being assembled, for instance, the sound curve is made in one of the parts while it is connected to the picture part.

Referring now to Fig. 4, 20 is a cylindrical record, with a helical sound curve 3 and a helical picture curve 4.

Cylindrical and flat records may be combined as shown in Figs. 5 and 6 where, respectively, a cylinder 20 bearing the sound curve 3 is combined with a flat record 5 bearing the picture spiral 4, and a cylinder 20 bearing the picture curve 4 is combined with a flat record 5 bearing the sound spiral 3.

Referring now to Fig. 7, this shows a combined projector and talking machine, with a casing 30, a crank 31, an opening 41 in a wall of the casing through which the pictures are projected on a screen, not shown, and a trumpet 44 at the end of a sound bracket 33.

This machine embodies the first type referred to in the introduction, with the plate-shaped record bearer 5 rotating at the normal speed for reproducing the pictures, and the sound bracket leading at a higher speed. The record bearer is of the type illustrated in Fig. 6, with the sound spiral 3 on its upper, and the picture spiral 4 on its lower face. Rotation is imparted to the record bearer 5 by a hollow shaft 35 with a record plate 70 at its upper end. The sound spiral 3 is scanned by a sound arm 32 which is pivoted to the sound bracket 33 at one end and equipped with a sound box at the other in the usual manner, but higher speed is imparted to the shaft 34 of the sound bracket 33 which extends through the hollow shaft 35 of the record plate 70, by suitable gearing, not shown.

36 is a source of light in a suitable casing 42 at the upper end of a support 23 on a nut which is carried on a threaded spindle 43 rotated from the gearing in casing 30 to displace the casing 42 in conformity with the position of the pictures on the spiral 4 as the spiral rotates while the pictures are scanned. The light incident on spiral 4 is deflected into a mirror 39 in the casing 42, and projected onto a screen, not shown, through opening 41. 37 is a diaphragm to which intermittent rotation is imparted by the gearing in the casing 30 of the machine so that each picture is exposed for a short period when in line with the ray from lamp 36.

In the apparatus illustrated in Figs. 7, 8, 11 and 12, the record bearer 5 rotates continuously and at uniform velocity, but the pictures are arrested on the screen by suitable means. For instance, the optical compensating device illustrated in Fig. 9 may be so designed that the pictures on the screen stand still notwithstanding the continuous movement of the record. Such a device is described in British Patent 301,082. Or the apparatus may be equipped with a shutter (not shown) which may be a rotary shutter with holes therein, or a fixed shutter which opens at a given time, like the shutter of a camera.

Referring to Fig. 8, 46 is a motor the shaft 45 of which directly rotates the sound arm 32, and 47 is a spur gear forming part of a reduction gearing for rotating a cylinder 20, with the sound curve 3 and the picture curve 4. Obviously, as in the previous example, the sound arm 32 leads the scanning of the pictures by the casing 42. The casing 42 is here mounted to slide on a rod 22 and equipped with a needle, not shown, for engaging in a groove of the picture spiral 4. 51 is a ground-glass plate in the opening of casing 42 through which the pictures may be viewed. 50 is a head receiver, and 49 are transmitters extending from the receiver to the sound bracket 33. Obviously, instead of connecting the sound arm directly to the motor shaft 45, it might be connected to the shaft by suitable reduction gearing, not shown. The rate of magnification of the pictures is not high in this machine but obviously the pictures on the ground-glass plate 51 may be viewed through a magnifying glass.

Referring now to Fig. 9, the mechanism for rotating the record bearer 5 and the sound bracket 33 is designed as described with reference to Fig. 7, the sound bracket leading the record, but here the picture spiral is on a transparent portion of the record bearer. The casing 42 for scanning the pictures is fixed and the pictures are projected on an optical compensation device, a rotary lens carrier 55, and finally projected out of the casing 39 through opening 41.

In the apparatus illustrated in Figs. 9, 10 and 13, means such as the spindle 43, Fig. 7, may be used for the movement of the optical compensating device to follow the spiral picture record.

Fig. 10 shows a machine of the type also referred to, with a fixed sound box at the end of an arm 60 from which the sound is transmitted to an amplifier 53 through a wire 52, and from the amplifier to the trumpet 44 through a wire 54. The casing 42 for scanning the pictures is here connected to the shaft 34 by an arm 61 which is divided for displacing the casing radially as it rotates. The mirror 39 projects the pictures to the rotary lens carrier 55 from which they are projected onto a screen, not shown, by a mirror 63. Here, the casing 42 lags with respect to the carrier plate 70 for the record 5, and the mirror 63 is fixed.

In the example illustrated the sound spiral is arranged within the picture spiral, as shown in Fig. 1. Conversely, the picture spiral might be arranged within the sound spiral which in this machine would result in a particularly simple and favorable design.

Referring now to Fig. 11, this machine is similar to that described with reference to Fig. 9 but has intermittent means such as a ratchet wheel 66 and a pawl 67 for rotating the record plate 70. The record stops while a picture is scanned by the casing 42, and then moves on for presenting the next picture while the sound bracket 33 rotates at uniform velocity. The resulting sound-scanning velocity varies between an upper and a lower limit on account of the intermittent rotation of the record 5. Obviously a sound record which is to be reproduced on a machine of this type, must be made on a similar machine with consideration of the non-uniform velocity of scanning.

Referring to Fig. 12, this machine has a fixed sound arm 60 with a sound box which may be of the electric type, like the machine in Fig. 10, but here the picture-scanning casing 42 moves intermittently. 72 is a driving spur gear on the shaft 35 of the record plate 70, 73 is a pawl which is fulcrumed on the gear 72, and 74 is a cam for controlling the pawl 73. The cam rotates with the pawl and is alternately raised and lowered for moving the pawl into and out of meshing relation to the ratchet wheel 75 on the hollow shaft 76 of the casing 42. The casing has a needle 21 at its lower end, like the casing shown in Fig. 8, and its upper end is mounted to slightly rock and also to slide on the shaft 76 so as to yield to irregular movements of the record 5, as in a talking machine.

Current is supplied to the lamp in the casing 42 through slip contacts 79 from a system +, —. 77 is an optical apparatus at the bottom of the casing below the lower end of pipe or hollow shaft 76, with the mirror 39 for projecting the pictures through opening 41.

Referring now to Fig. 13, both the pictures and the sound curve are scanned by optical means. The picture scanning means include the lamp 36, the rotary lens carrier 55 and their accessories, as described with reference Fig. 9. The record bearer 5 is transparent throughout and both records are on its lower face. The sound record is photographed in this instance and is scanned by means of a lamp 81 in a casing 86 in which also the lamp 36 is mounted, and a photo-electric cell 85 which is fitted to slide on a rotating sound arm 84. Preferably the casing 86 is detachable, or hinged to the frame of the casing 30 so that it moves out of the way when the record 5 is exchanged.

If it is desired to design the machine on the lines of a normal talking machine the record bearer may be made opaque for the pictures and the pictures be scanned from below, as shown in Fig. 7. Similarly the photographic sound record may be scanned from below so that the machine is without any superstructures above the record 5.

As mentioned, the showing is more or less diagrammatic and many details forming no part of my invention, have been omitted, for instance, mechanisms for operating and feeding, etc.

It will be understood that my invention may be modified in various ways without departing from its gist which is the scanning at distinct velocities.

Various means have been described for scanning the pictures, and it may be mentioned that flashes of light may also be employed for this purpose. The optical scanning means may be so designed as to concentrate the light on quite a small area and to move radially as the lens carrier 55 is moved radially. This results in maximum light efficiency which is particularly favorable for large screens. Reflecting mirrors may be provided for reflecting the light in a repeatedly bent path and for increasing the size of the pictures. The mirrors, not shown, may be arranged in the machine casing 30 with their brackets.

As mentioned, several sets of sound and picture curves may be combined on a single record bearer. Thus, in the record shown in Fig. 2, with the picture curve 4 on the lower, and the corresponding sound curve 3 on the upper face of the record bearer, a second set might be located by placing its sound curve within the picture curve 4 on the lower, and its picture curve about the sound curve 3 on the upper, face of the record bearer 5. The two sets are alternately presented to their respective scanning means by turning the record upside down, and vice versa. Regarding the making of the records, the sound and picture curves may be obtained in a single operation instead of several operations, for instance by printing the pictures and simultaneously impressing the sound groove by suitable printing tools. In the photographic method described with reference to Fig. 13, the picture and sound records may be made at the same time by a common copying process. Obviously, in all cases the question whether separate or simultaneous making of the record curves is preferable, must be decided as required by the conditions of each particular case.

Various modifications may also be made in the machines which as illustrated by way of example in Fig. 7, resemble normal talking machines and may be collapsible cabinet or portmanteau apparatus. Preferably the detachable portions of the sound passages are adapted to be concealed in the space between the record and the cover of the casing. Projection screens may be carried in a similar manner. Mirrors, periscope like and other accessories may be provided and, if desired, carried in the portable casings of the machines, for conducting the light from the hole 41 to the screen, not shown.

Instead of placing the trumpet 44 on top of the sound bracket as shown in Figs. 7, 9 and 11, the sound may be conducted in downward direction or into the casing 30 so that the voice issues from the casing 30, as in some talking machines. The neck of the trumpet, instead of being connected to a trumpet, is in this case connected to a sound passage extending laterally from the record plate and downwards through the top plate of the casing in a curve, or the sound bracket 33 may be curved in a downward direction and extended into the casing 30 through an axial opening in the record bearer 5 and the record plate 70. If this rotary sound bracket is connected to a fixed passage at the side of the record bearer and record plate which extends through the top plate of the casing, it is not necessary to provide an extension at the record plate for holding the record bearer, but the record may be placed on the record plate or removed without undoing vertical connections between the extension and the rotary sound bracket. The rotary sound bracket must then be operated from above, the driven mechanism extending upwardly through the fixed extension of the sound passage and being connected to the rotary sound bracket by bevel gears or other transmitting means. The sound bracket is preferably hinged, as in talking machines, and there is nothing between the sound arm and the record plate which might interfere with the exchange of the records.

If an axial arrangement of the sound bracket is preferred the shaft of the record plate is replaced by a tube, like the tubular shaft 76 for the light in Fig. 12, and the rotary bracket mounted in bearings of the tube. For the reasons stated the bracket should rotate faster than the record. If the rotary sound bracket is detachable for storing it in the casing, a clutch must be provided for automatically connecting it to its driving mechanism.

Acoustic sound passages may be replaced by electric ones, the passages being replaced by simple carrying and motion-imparting arms through which wires are conducted to their terminals. Such means may be combined with radio amplifiers, and into a single unit, if desired.

My invention is quite independent of the way in which the sound is reproduced. It may be applied to apparatus like talking machines but also to apparatus in which sounds are generated from photographic, magnetic and other records.

Records according to my invention may be made directly from the human voice or any other sound, or from existing records. This applies to picture and sound records. When transmitting sound records, any type of record, grooves, photographic, magnetic, electrolytic records, etc., may be translated into the same, or any other, type of record within the possibilities of the support.

All reproducing machines which have been shown may, with some slight alterations, be used for the making of records. To change a reproducing into a recording machine the record 5 on which the pictures are photographed must be protected from daylight, the optical scanning means be replaced by an objective of a cinematograph apparatus, and the acoustic scanning means by a recorder with a stylus or the like.

I claim:

1. In an apparatus of the class described, a record bearer for a sound record of a plurality of continuous turns and a picture record of a plurality of continuous turns of lesser number than the sound record, sound sensitive transmitting means and the picture sensitive transmitting means cooperating with the record bearer to transmit respectively the sound and picture records, and means for imparting a relative movement between the sound record and the sound sensitive means and between the picture record and the picture sensitive means wherein the relative movements are different in accordance with the difference in length of the sound and picture records.

2. In an apparatus of the class described, a record bearer for a sound record in the form of a spiral of a plurality of turns and a picture record in the form of a spiral of a plurality of turns of lesser number than the sound record, sound sensitive transmitting means and picture sensitive transmitting means cooperating with the bearer to transmit respectively the sound and picture records, and means for imparting a relative movement between the sound record and the sound sensitive means and between the picture record and the picture sensitive means wherein the relative movement between the sound record and the sound sensitive means is greater than that between the picture record and the picture sensitive means in accordance with the difference in length of the sound and picture records.

3. In an apparatus of the class described, a record bearer for a picture record arranged in a spiral of a plurality of turns and a sound record arranged in a spiral of a plurality of turns of greater number than the picture record, sound pick-up means cooperating with the sound record, optical rectifying means cooperating with the picture record, and means for imparting relative movement between the picture record and the optical rectifying means and between the sound record and the sound pick-up means, wherein the relative movement between the sound record and the sound pick-up means is greater than that between the picture record and the optical rectifying means in accordance with the difference in length of the sound and picture records.

4. In an apparatus of the class described, a record bearer for a picture record arranged in a spiral of a plurality of turns and a sound record arranged in a spiral of a plurality of turns of greater number than the picture record, sound pick-up means cooperating with the sound record, optical rectifying means cooperating with the picture record, means for rotating said record bearer relative to said optical rectifying means, and means for rotating said sound pick-up means in a direction opposite to said record bearer for scanning the longer sound record at a higher speed than the picture record.

5. In an apparatus of the class described, a record bearer for a picture record arranged in a spiral of a plurality of turns and a sound record arranged in a spiral of a plurality of turns of greater number than the picture record, sound pick-up means cooperating with the sound record, optical rectifying means cooperating with the picture record, means for rotating said record bearer relative to said optical rectifying means, and means for rotating said sound pick-up means in the same direction as said record bearer but at such a higher velocity that the longer sound record is scanned at a higher speed than the picture record.

6. In an apparatus of the class described, a record bearer for a picture record arranged in a spiral of a plurality of turns and a sound record arranged in a spiral of a plurality of turns of greater number than the picture record, sound pick-up means cooperating with the sound record, optical rectifying means cooperating with the picture record comprising means for transferring the continuous series of pictures successively into an intermittent moving picture, and means for imparting relative movement between the picture record and the optical rectifying means and between the sound record and the sound pick-up means, wherein the relative movement between the sound record and the sound pick-up means is greater than that between the picture record and the optical rectifying means in accordance with the difference in length of the sound and picture records.

7. In an apparatus of the class described, a record bearer for a picture record arranged in a spiral of a plurality of turns and a sound record arranged in a spiral of a plurality of turns of greater number than the picture record, sound pick-up means cooperating with the sound record on one side of said record bearer, optical rectifying means cooperating with said picture record comprising an optical compensation device on the opposite side of said record bearer, and means for imparting relative movement between the picture record and the optical rectifying means and between the sound record and the sound pick-up means, wherein the relative movement between the sound record and the sound pick-up means is greater than that between the picture record and the optical rectifying means in accordance with the difference in length of the sound and picture records.

8. In an apparatus of the class described, a record bearer for a picture record arranged in a spiral of a plurality of turns and a sound record arranged in a spiral of a plurality of turns of greater number than the picture record, sound pick-up means cooperating with the sound record, optical rectifying means cooperating with the picture record, means for rotating said record bearer relative to said optical rectifying means comprising a hollow drive shaft, and means comprising a shaft extending through said hollow shaft for rotating said pick-up means in such a direction and at such a velocity that the longer sound record is scanned at a higher speed than the picture record.

9. In an apparatus of the class described, a record bearer including a cylindrical portion for a picture record arranged in a spiral of a plurality of turns and a sound record arranged in a plurality of turns of a greater number of turns than the picture record, sound pick-up means cooperating with the sound record, optical rectifying means cooperating with the picture record, means for rotating said record bearer relative to said optical rectifying means, and means comprising a drive shaft extending axially through said cylindrical portion of said record bearer for rotating said sound pick-up means in such a direction and at such a velocity that the longer sound record is scanned at a higher speed than the picture record.

10. In an apparatus of the class described, a disk record bearer for a picture record arranged in a spiral of a plurality of turns and a sound record arranged in a spiral of a plurality of turns of greater number than the picture record, sound pick-up means cooperating with the sound record, optical rectifying means cooperating with the picture record, means for rotating said disk record bearer relative to said optical rectifying means, and means operative beyond the periphery of said disk record bearer for rotating said sound pick-up means in such a direction and at such a velocity that the longer sound record is scanned at a higher speed than the picture record.

11. In an apparatus of the class described, a record bearer for a picture record arranged in a spiral of a plurality of turns and a sound record arranged in a spiral of a plurality of turns of greater number than the picture record, electrical sound pick-up means cooperating with the sound record, optical rectifying means cooperating with the picture record, and means for imparting relative movement between the picture record and the optical rectifying means and between the sound record and the sound pick-up means, wherein the relative movement between the sound record and the sound pick-up means is greater than that between the picture record and the optical rectifying means in accordance with the difference in length of the sound and picture records.

12. In an apparatus of the class described, a record bearer for a picture record arranged in a spiral of a plurality of turns and a sound record arranged in a spiral of a plurality of turns of greater number than the picture record, said picture record and sound record being disposed in two concentric zones with respect to the center of said record bearer, sound pick-up means cooperating with the sound record on one side of said record bearer, optical rectifying means cooperating with said picture record comprising an optical compensation device on the opposite side of said record bearer, said sound pick-up means and optical rectifier means being displaced with respect to the center of said record bearer corresponding to the concentric displacement of the zones for the sound and picture records respectively, and means for imparting relative movement between the picture record and the optical rectifying means and between the sound record and the sound pick-up means, wherein the relative movement between the sound record and the sound pick-up means is greater than that between the picture record and the optical rectifying means in accordance with the difference in length of the sound and picture records.

13. As an article of manufacture, a unitary record bearer having thereon a continuous spiral sound record and a continuous spiral picture record, said records representing the same sequence and being located on distinct portions of the record bearer, the pictures of the picture record being arranged in consecutive order on the record bearer and progressing at a slower linear rate than said sound record, the records being adapted to be reproduced by a machine having an optical compensating device and a single continuously operating sound scanning device which has a higher speed relative to the record bearer than the optical compensating device.

BERTHOLD FREUND.